United States Patent

Walz et al.

[11] Patent Number: 5,959,001
[45] Date of Patent: Sep. 28, 1999

[54] PIGMENT PREPARATIONS

[75] Inventors: Klaus Walz; Gerd Schmitz, both of Leverkusen; Michael Kressner, Leichlingen; Udo Herrmann, Dormagen; Josef Leitermann, Leverkusen, all of Germany

[73] Assignee: Bayer Aktiengesellschaft, Leverkusen, Germany

[21] Appl. No.: 08/859,961

[22] Filed: May 21, 1997

[30] Foreign Application Priority Data

May 24, 1996 [DE] Germany .................. 196 20 989

[51] Int. Cl.$^6$ ..................................... C09D 5/00
[52] U.S. Cl. .................. 523/161; 524/247; 524/251; 524/366; 524/378; 524/556
[58] Field of Search .............. 523/161; 524/247, 524/251, 366, 378, 556

[56] References Cited

U.S. PATENT DOCUMENTS

| | | | |
|---|---|---|---|
| 4,049,610 | 9/1977 | Bunge et al. | 260/31.2 N |
| 4,156,616 | 5/1979 | Dietz et al. | 106/308 N |

FOREIGN PATENT DOCUMENTS

| | | |
|---|---|---|
| 0063302 | 10/1982 | European Pat. Off. . |
| 0 416 819 | 3/1991 | European Pat. Off. . |
| 0603546 | 6/1994 | European Pat. Off. . |
| 0 764 701 | 3/1997 | European Pat. Off. . |
| 3803810 | 8/1989 | Germany . |
| 4236709 | 5/1994 | Germany . |
| 1463216 | 2/1977 | United Kingdom . |
| 1472905 | 5/1977 | United Kingdom . |

OTHER PUBLICATIONS

Le A 29 254, "Pigment and Carbon Black Preparations (Colouring Agent Preparations for Colouring Plastics)", Abstract and (English translation of DE–A–42 36 709), pp. 1–15.

Le A 29 340 US, "Pigment and Carbon Preparations (Colorant Preparations for Colouring Plastics)", Abstract an (English translation of EP–A–0 603 546), pp. 1–13.

Patent Abstracts of Japan, vol. 018, No. 374 (C–1219) Jun. 30, 1994, & JP 06 87941 A (Toyoda Gosei Co., Ltd) Mar. 29, 1994.

*Primary Examiner*—Edward J. Cain
*Attorney, Agent, or Firm*—Joseph C. Gil; Richard E.L. Henderson

[57] ABSTRACT

Pigment preparations comprising at least a) 5 to 80% by weight, based on the preparation, of pigment, b) a paste-making agent which is liquid at 20° C. under normal pressure, c) an amine and/or salt thereof with an average molecular weight, determined as the number-average, of $\bar{M}_n \leq 500$ g/mol and d) a homo- and/or copolymer of ethylenically unsaturated monomers or comonomers having an average molecular weight, determined as the number-average, of $\bar{M}_n =$ 10,000–100,000, are suitable for pigmenting organic macromolecular material, in particular polyurethane foams.

20 Claims, No Drawings

PIGMENT PREPARATIONS

The invention relates to pigment preparations, a process for their preparation, a process for pigmenting organic macromolecular material, in particular polyurethane-based plastics, and pigmented plastics.

Polyurethanes as paint binders or a coating material, for example for textiles, are prepared in a highly elastic or hard, solvent-free or solvent-containing form in a wide range of one- or two-component systems. If these materials are pigmented, there is the problem of finding a suitable pigment carrier in which the pigments can be dispersed in highly concentrated form without flocculation and which is compatible with the various polyurethanes, so that a specific pigment paste does not have to be kept ready for each specific system. In the case of the two-component systems customary in the paint industry, usually only the relatively low-viscosity polyol components in which not only carbon black or organic pigments, such as phthalocyanines but also inorganic pigments, such as iron oxide yellow or iron oxide red, cannot be dispersed without flocculation and thixotropy phenomena are available for pigmenting. These circumstances initially make any trituration problematic and uneconomical, but furthermore, after addition of the isocyanate components, also have an adverse effect on flow, gloss, depth of colour, covering power and gloss retention of the cured paint films.

Very high molecular weight substances which have only a limited miscibility with one another (one- or two-component systems) and merely for viscosity reasons do not allow high pigment concentrations are present in the polyurethane coating materials for textiles.

In addition to these homogeneous polyurethanes, cellular polyurethanes, which can vary from rigid to extremely flexible foams in respect of their elasticity have acquired importance. These foams are chiefly coloured shortly before foaming in a mixing head, in which polyols and polyisocyanates are intimately mixed with colour pastes, if appropriate in the presence of auxiliaries. Such colour pastes usually comprise polyester- or polyether-polyols as binders, but the pigment absorption properties of these, in particular with respect to carbon black, is so low that highly viscous colour pastes already exist at carbon black concentrations of 10 to 18%. With normal metering in of a colour paste of 3 to 5% by weight, based on the sum of all the components entering into the foam, this still having no great influence on the mechanical properties of the foams, no deep coloration is achieved, but in the case of carbon black only a grey coloration.

In order to allow good depth of colour of the material to be pigmented, to ensure meterability during preparation of the material and to keep the influence of the binder on the mechanical properties of these materials, especially foams, low, readily pumpable pastes with high pigment contents are desirable.

Good pumpability and flowability of the colour pastes at the desired high pigment contents also plays an important role in the preparation of the colour pastes. Highly viscous and/or non-flowing pastes can be prepared industrially only on roll mills or in kneaders.

The object of the present invention is therefore also to provide pigment preparations which have the lowest possible viscosity at high pigment contents and good flow properties throughout the entire preparation process, in particular with continuously operated stirred bead mills, and are therefore particularly economical to prepare.

Several paths have already been taken in the literature in order to realize these aims. It is known from DE-A 3 115 651 to add a polyvinylpyrrolidone as a viscosity-lowering additive to the polyether-polyol binder. In DE-A 3 803 810, a copolymer of α-olefin and (α,β-unsaturated dicarboxylic acid esters is added as an additive to the binder. Organotitanium compounds (DE-A 4 236 709) and oil-modified polyurethanes (EP-A 603 546) are furthermore known as additives to binders comprising polyester-polyols or polyether-polyols. In contrast, a resin containing carbodiimide groups is used as a pigment carrier in DE-A 2 402 839.

However, the pigment preparations known from the prior art still have some disadvantages. Thus, some additives or binder systems are usually only active with certain pigments. Furthermore, agglomerations of the pigment readily occur in the known preparations, so that the desired colour strength in the material to be coloured cannot be achieved. With some of these preparations, for example, undesirable agglomerations or aggregate formation occur during the foaming process of polyurethane as a consequence of the dilution effect of the paste, which means that the desired depth of colour is likewise not reached.

It has now been found that the disadvantages listed can be overcome with the pigment preparations according to the invention, comprising at least
  a) 5 to 80% by weight, based on the preparation, of pigment,
  b) a paste-making agent which is liquid at 20° C. under normal pressure,
  c) an amine and/or salt thereof with an average molecular weight, determined as the number-average, of $\overline{M}_n \leq 500$ g/mol and
  d) a homo- and/or copolymer of ethylenically unsaturated monomers or comonomers having an average molecular weight, determined as the number-average, of $\overline{M}_n = 10,000–100,000$.

In a preferred embodiment, the pigment preparations according to the invention comprise
  a) 5 to 80% by weight, in particular 10 to 60% by weight, of pigment,
  b) 10 to 94% by weight, in particular 40 to 90% by weight, of the paste-making agent,
  c) 0.2 to 10% by weight, in particular 0.5 to 5% by weight, of the amine and/or salt thereof and
  d) 0.2 to 10% by weight, in particular 0.5 to 3% by weight, of the homo- and/or copolymer of ethylenically unsaturated monomers or commonomers, the percentage data in each case relating to the sum of components a) to d).

The pigments of the pigment preparations according to the invention are not subject to any limitation. They can be organic or inorganic in nature. Suitable organic pigments are, for example, those of the azo, anthraquinone or thioindigo series, and furthermore other polycyclic pigments, for example from the phthalocyanine, quinacridone, dioxazine, naphthalenetetracarboxylic acid, perylenetetracarboxylic acid or isoindioline series, and metal complex pigments or laked dyestuffs, such as Ca, Mg or Al lakes of dyestuffs containing sulphonic acid and/or carboxylic acid groups, as well as carbon black, a large number of which are known, for example, from Color Index, 2nd Edition. Suitable inorganic pigments are, for example, zinc sulphides, ultramarine, titanium dioxides, iron oxides, nickel- or chromium-antimony-titanium dioxide, cobalt blue, chromium oxides and chromate pigments. Carbon black, which is also regarded as a pigment in the context of this Application, is preferably employed.

Particularly preferred pigments of the pigment preparations according to the invention are, for example, phthalocyanine pigments, such as Pigment Blue 15 and Pigment Green 7, arylamide pigments, such as Pigment Yellow 83 and Pigment Yellow 17, monoazo pigments, such as Pigment Red 48, Lithol pigments, disazo condensation pigments, such as Pigment Red 166, and carbon blacks, zinc sulphides and ultramarines. Carbon blacks having a BET surface area of 30 to 230 m²/g are especially preferred.

Suitable paste-making agents are preferably ethers or esters of monoalcohols, polyols or polyether-polyols, preferred ethers being those having at least one hydroxyl group. Examples of these which may be mentioned are esters of aliphatic, cycloaliphatic or aromatic carboxylic acids or dicarboxylic acids having up to 8 C atoms with glycols or polyglycol ethers, and ethers of aliphatic, cycloaliphatic or aromatic mono- or polyalcohols having up to 8 C atoms with glycols or polyglycol ethers.

Polyols, in particular polyether-polyols, which may be mentioned are, for example, those which are liquid at 20° C. and 760 mm Hg and which preferably have molecular weights from 50 to 10,000 g/mol, in particular from 150 to 10,000 g/mol. These can be prepared, for example, by adding ethylene oxide and/or propylene oxide onto polyols, such as ethylene glycol, butylene glycol and, in particular, trimethylolpropane. Reactions products of optionally branched $C_1$–$C_6$ alcohols, $C_5$–$C_8$-cycloalkanols which are optionally substituted by $C_1$–$C_4$-alkyl or phenols optionally substituted by $C_1$–$C_4$-alkyl with 1 to 8 equivalents of ethylene oxide and/or propylene oxide may furthermore be mentioned.

Examples of esters which may be mentioned are those such as are described, for example in EP-A 14 912. These are, for example, terephthalic acid diglycol ester or a linear oligomer of terephthalic acid and ethylene glycol or a mixture of such oligomers which has been obtained by transesterification of dimethyl terephthalate with ethylene glycol.

The polyester-polyols preferably have an average molecular weight, determined as the number-average, of 300 to 800 g/mol, particularly preferably 400 to 600 g/mol. They preferably have a viscosity of 1.5 to 3 Pa·s, preferably 1.8 to 2.8 Pa·s, at room temperatures (20° C.).

Preferred polyesters are obtained by reaction of phthalic acid and polyalcohols, if appropriate as a mixture with monohydric alcohols having 1 to 18 C atoms.

The phthalic acid mentioned as preferred can also be replaced by other dicarboxylic acids, such as terephthalic acid, succinic acid or adipic acid.

Polyalcohols which can be employed are, for example, glycol, diethylene glycol, butane-1,4-diol, butene-1,4-diol, butine-1,4-diol, hexane-1,6-diol, octane-1,8-diol, trimethylolpropane, glycerol, pentaerythritol, sorbitol, sucrose or, preferably, triethylene glycol.

Examples of monohydric alcohols having 1 to 18 C atoms which may be mentioned are: methanol, ethanol, n-propanol, i-propanol, allyl alcohol, crotyl alcohol, n-butanol, i-butanol, sec-butanol, t-butanol, n-amyl alcohol, neopentyl alcohol, n-hexyl alcohol, n-octyl alcohol, capryl alcohol, n-decyl alcohol, lauryl alcohol and myristyl alcohol.

Other suitable esters are reaction products of aliphatic $C_1$–$C_6$-carboxylic acids or aromatic carboxylic acids substituted by $C_1$–$C_4$-alkyl or OH with 1 to 8 molar equivalents of ethylene oxide and/or propylene oxide.

Further preferred paste-making agents which may be mentioned are monohydroxy ethers, which are preferably understood as meaning monohydroxyalkyl ethers, in particular those which are derived from homo-, co- or block co-polyether-polyols which have been obtained by reaction of ethylene oxide and/or propylene oxide with water or with low molecular weight polyfunctional alcohols which have at least two hydroxyl groups, or which are derived from low molecular weight polyfunctional alcohols having at least two, preferably two or more, hydroxyl groups. Polyfunctional alcohols are understood as meaning, in particular, aliphatic $C_2$–$C_6$-alcohols, such as, for example, ethylene glycol, 1,2- or 1,3-propanediol, 1,2- or 1,4-butanediol, 1,6-hexanediol, glycerol, trimethylolpropane or pentaerythritol. Monohydroxy ethers, in particular monohydroxy polyethers, are particularly preferred. Monoalkyl ethers, in particular mono-$C_1$–$C_4$-alkyl ethers, which may be mentioned are preferably those which are derived from diethylene glycol, or alkylene oxide adducts, started on ethylene glycol or 1,2- or 1,3-propanediol, of ethylene oxide and/or propylene oxide having an average molecular weight, determined as the number-average, of 62 to 5000 g/mol. Preferred monoalkyl-hydroxy ethers are ethylene oxide- and/or propylene oxide-polyethers started on mono-$C_1$–$C_{12}$-alcohols, such as aliphatic, cycloaliphatic or aromatic monohydroxy-compounds, in particular the monohydroxy ethers started on methanol, ethanol, isopropanol, n-propanol, n-, sec- and tert-butanol, phenol, cresol, tert-butylphenol or cyclohexanol. Monohydroxyalkyl ethers which are also preferred are ethylene oxide- and/or propylene oxide-polyethers started on hydroxyalkylamides, such as $CH_3CON(CH_3)CH_2CH_2OH$, N-hydroxyethylcaprolactam or N-hydroxypropyl-caprolactam.

Preferred paste-making agents are glycol ethers which corresponds to the formula (I)

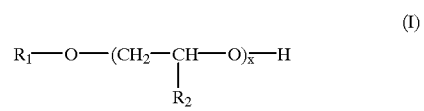

wherein
$R_1$ denotes optionally branched $C_1$–$C_6$-alkyl, $C_5$–$C_8$-cycloalkyl which is substituted by $C_1$–$C_4$-alkyl in particular cyclohexyl which is optionally substituted by methyl, or phenyl which is optionally substituted by one or more $C_1$–$C_4$-alkyl radicals, $R_2$ denotes hydrogen or $C_1$–$C_3$-alkyl and x denotes a number from 1 to 8, preferably 1 to 4.

Particularly preferred as component b) are mono-$C_1$–$C_4$-alkyl glycol ethers, in particular monomethyl, monethyl, monoisopropyl, mono-n-propyl, mono-n-butyl, mono-sec-butyl or mono-tert-butyl glycol ethers, especially preferably mono(n-butyl)ethylene glycol ether or mono(n-butyl) diethylene glycol ether.

Paste-making agents which are likewise preferred are glycol esters which correspond to the formula II

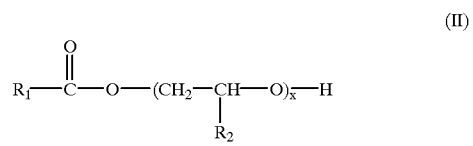

wherein
$R_1$, $R_2$ and x have the meaning given for formula (I).

Amines or salts thereof of component c) which are preferably employed are those which have a nitrogen content, based on the particular compound, of ≧8% by weight. Low molecular weight ($C_1$–$C_8$) aliphatic or cycloaliphatic amines, where the aliphatic or cycloaliphatic radicals are optionally substituted by, for example, hydroxyl, alkoxy or carboxyl groups are particularly preferred.

Examples which may be mentioned are: ethanolamine, methylethanolamine, dimethylethanolamine, diethylethanolamine, diethanolamine, methyldiethanolamine, triethanolamine, 2-hydroxypropylamine, dimethylpropanolamine, diethylpropanolamine, dipropanolamine, tripropanolamine, 2-dimethylaminoethylethanol, cyclohexylamine, methylcyclohexylamine, dimethylcyclohexylamine, hydroxyethyl-cyclohexylamine, dihydroxyethyl-cyclohexylamine, hydroxyethyl-ethylenediamine and hydroxypropylethylenediamine. However, suitable amines are also heterocyclic compounds with basic amino groups, such as, for example, piperazine, N-hydroxyethylpiperazine, morpholine, N-methylmorpholine, N-hydroxyethylmorpholine, pyrrolidine, compounds of imidazolidine or oxazolidine, ethylenediamine, 1,2-propylenediamine, diethyltriamine, triethylenetetramine, tetraethylenepentamine or reaction products thereof with ethylene oxide or propylene oxide, 3-dimethylamino-propylamine, polyglycol ethers with terminal amino groups, reaction products of di-isocyanates with, for example, dimethyl-ethanolamine or dimethylamino-propylamine, aminoacetic acid, aminodiacetic acid, nitrilotriacetic acid, ethylenediaminetetraacetic acid or amidomethanephosphonic acid.

In the context of this Application, salts of the amines of component c) are understood as meaning salts of an organic or inorganic acid, quaternary ammonium compounds, amine oxides and betaines, which also includes internal salts of aminocarboxylic acids.

Possible inorganic or organic acids of the salts of the amines of component c) are, for example, hydrochloric acid, sulphuric acid, phosphoric acid, phosphorous acid, boric acid, amidosulphonic acid, formic acid, acetic acid, hydroxyacetic acid, chloroacetic acid, lactic acid, citric acid, tartaric acid, gluconic acid, pyruvic acid, succinic acid, adipic acid or maleic acid.

Examples of quaternary ammonium compounds, amine oxides or betaines of the amine of component c) which are to be mentioned are those such as can be prepared, for example, from tertiary amines by reaction with alkylating agents, such as dimethyl sulphate, diethyl sulphate, ethylene oxide, propylene oxide, dimethyl phosphite, dimethyl methanephosphonate, benzyl chloride, chloroacetamide, methyl chloroacetate or sodium chloroacetate, or with hydrogen peroxide.

Preferred pigment preparations comprise, as component c), one or more of the amines: ethanolamine, diethanolamine, triethanolamine, propanolamine, dipropanolamine, tripropanolamine, methylethanolamine, dimethylethanolamine, methylpropanolamine, dimethylpropanolamine, 3-dimethylaminopropylamine, N-methylmorpholine, N-hydroxyethylmorpholine, N-hydroxyethyl-cyclohexylamine, bis-hydroxyethyl-cyclohexylamine, and/or their salts of formic acid, acetic acid, citric acid, gluconic acid, glycolic acid, lactic acid, phosphoric acid, phosphorous acid, sulphuric acid, boric acid or toluenesulphonic acid.

Homo- and copolymers of component d) are preferably understood as meaning those products which are capable of reducing the viscosity of paste-like compositions when added in relatively small amounts.

The homo- and copolymers of component d) which are soluble at 20° C. in organic solvents and/or in the paste-making agent used are particularly preferred. It is particularly preferable here if the solubility in the paste-making agent used is >10 g/l at 20° C. Examples of such polymers which may be mentioned are: polyvinyl acetate, polyvinylformal, polyvinylbutyral, polyvinylpyrrolidone, cellulose acetates, cellulose acetate-butyrates, copolymers of vinylpyrrolidone with vinyl acetate, vinyl ethers or styrene, polymers or copolymers of acrylic or methacrylic esters with other ethylenically unsaturated comonomers and others.

If appropriate, the pigment preparations according to the invention comprise, as further components, further additives, such as diluents, for example di- or tributyl phosphate or methoxypropyl acetate, stabilizers and/or preservatives, silica-gels, graphite or surfactants, in particular nonionic surfactants.

Generally the pigment preparation according to the invention consist a viscosity less than 15,000 mPa·s, at 23° C., $D=7.3\ s^{-1}$, preferably 500 to 10,000 mPa·s, each estimated according to the method of DIN 53019 (ISO 6385).

The invention furthermore relates to a process for the preparation of the pigment preparations according to the invention, which is characterized in that, for example components a) to d) are mixed in any desired sequence and the mixture is then homogenized, for example by means of a high-speed stirrer or dissolver.

After the mixing of components a), b), c) and d), the mixture is preferably ground to the desired fine division of the pigment in a continuous or discontinuous manner in the customary wet comminution units, such as, for example, kneaders, attrition mills, roll mills, dissolvers, rotor-stator mills, bead mills and particularly preferably, high-speed stirred bead mills which have speeds of rotation of 5 to 60 m/s, preferably 10 to 20 m/s, and comprise grinding bodies of steel, glass, ceramic, sand or plastic in a size of 0.1 to 10 mm, preferably 0.5 to 2 mm.

If the amine of component c) is to be employed, for example, in its salt form of an inorganic or organic acid, the salt formation can also first take place, for example, after the grinding, by addition of the acid.

According to the invention, further additives can be added before or after addition of the pigment and before or after grinding.

The invention furthermore relates to a process for pigmenting organic macromolecular material, in particular polyurethane foams, which is characterized in that the preparations according to the invention are used for colouring such materials, in particular polyurethane foams. In this procedure, the preparation according to the invention is added, for example, to either the polyol component or the polyisocyanate component or reaction mixtures thereof before or during formation of the polyurethane. The further reaction is carried out in the customary manner, i.e. as for non-pigmented polyurethane plastics. Information on this is to be found, for example, in G. Oertel, Kunststoff-Handbuch [Plastics Handbook], Volume 7, Polyurethane [Polyurethanes], Hansa Verlag Munich, Vienna 1983, English edition 1985.

The polyurethane foams are preferably coloured shortly before foaming in a mixing head in which the polyols and polyisocyanates are intimately mixed with the pigment preparations according to the invention, if appropriate in the presence of auxiliaries.

EXAMPLES

Example 1 (Comparison Example)

A black pigment preparation comprising 18% by weight of a carbon black colourant (component a) having a BET surface area of 45 m²/g and a DBP adsorption of 45 ml/100 g and 82% by weight of an adipic acid ester (component b) was homogenized by means of a dissolver and then ground in a high-speed discontinuous stirred bead mill over a period of 30 minutes.

The adipic acid ester employed, which is a reaction product of adipic acid with 1,2-propylene glycol, had an OH number of 167 mg of KOH/g, an acid number of 0.5 mg of KOH/g and a viscosity of 190 to 200 mPas at 50° C.

The preparation thus obtained had such a high viscosity that industrial preparation on continuously operated stirred bead mills was not possible.

Use Example 1

To evaluate the colour strength, the pigment preparations were incorporated into a polyester-urethane foam in accordance with the following recipe:

2 g of the pigment preparation were added to a mixture of 200 g of a polyester of adipic acid, diethylene glycol and trimethylol propane having an OH number of 50 and 73.2 g of a mixture of 65% of 2,4- and 35% of 2,6-toluylene diisocyanate, and the mixture was caused to foam by the customary addition of water and auxiliaries. The visually determined colour strength using the preparation according to Example 1 was set at 100% and served for comparison with the following examples.

Example 2

By the process described in Example 1, a pigment preparation which comprised 35 parts of the carbon black colourant employed therein, 62.2 parts of butyl diglycol (diethylene glycol monobutyl ether), 2 parts of N-methylmorpholine and 0.8 part of a polyvinylbutyral having a molecular weight of 20,000 was prepared.

After grinding, a readily flowable, pumpable carbon black preparation which was stable to flocculation and had a high colour strength (see table) was obtained.

Example 3

By the same process as described in Example 2, a black pigment preparation comprising 40 parts of the carbon black colourant from Example 1, 55.25 parts of diethylene glycol monobutyl ether, 3.0 parts of N-methyldiethanolamine, 1.0 part of polyvinylbutyral and 0.75 part of citric acid was prepared. After grinding, a flowable, pumpable carbon black preparation of high colour strength was obtained.

Example 4

By the same process as described in Example 2, a black pigment preparation comprising 35 parts of the carbon black colourant from Example 1, 46.2 parts of diethylene glycol monobutyl ether, 15 parts of an adipic acid ester (see Example 1), 2.0 parts of triethanolamine, 1.0 part of polyvinylbutyral and 0.8 part of o-phosphoric acid (85% strength) was prepared. After grinding, a readily flowable, pumpable carbon black preparation of high colour strength was obtained.

Example 5

By the same process as described in Example 2, a black pigment preparation comprising 35 parts of the carbon black colourant from Example 1, 60.2 parts of diethylene glycol monobutyl ether, 2.0 parts of triethanolamine, 1.2 parts of N,N-dimethylethanolamine, 0.8 part of polyvinylbutyral and 0.8 part of o-phosphoric acid (85% strength) was prepared. After grinding, a readily flowable, pumpable carbon black preparation of high colour strength was obtained.

Example 6

By the same process as described in Example 2, a black pigment preparation comprising 35 parts of the carbon black colourant from Example 1, 61.7 parts of diethylene glycol monobutyl ether, 2.0 parts of triethanolamine, 0.8 part of polyvinylbutyral and 0.5 part of adipic acid was prepared. After grinding, a readily flowable, pumpable carbon black preparation of high colour strength was obtained.

Example 7

By the same process as described in Example 2, a black pigment preparation comprising 35 parts of the carbon black colourant from Example 1, 60.8 parts of a reaction product of 1 mol of 4-tert-butylphenol with 4 mol of ethylene oxide, 3 parts of triethanolamine and 1.2 parts of polyvinylbutyral was prepared. After grinding, a readily flowable, pumpable carbon black preparation of high colour strength was obtained.

Example 8

By the same process as described in Example 2, a black pigment preparation comprising 35 parts of the carbon black colourant from Example 1, 63 parts of diethylene glycol monobutyl ether, 1.0 part of 1-amino-3-dimethylaminopropane and 1.0 part of polyvinylbutyral was prepared. After grinding, a readily flowable, pumpable carbon black preparation of high colour strength was obtained.

Example 9

By the same process as described in Example 2, a black pigment preparation comprising 30 parts of a carbon black colourant from Example 1, 66 parts of a reaction product of 1 mol of acetic acid with 4 mol of propylene oxide, 3 parts of triethanolaamine and 1.0 part of polyvinylbutyral was prepared. After grinding, a readily flowable, pumpable carbon black preparation of high colour strength was obtained. The same result was obtained when the reaction product of caprolactam with 4 mol of propylene oxide was employed as the paste-making agent.

Example 10

By the same process as described in Example 2, a black pigment preparation comprising 30 parts of a carbon black colourant having a BET surface area of 80 m²/g and a DBP (dibutyl phthalate) adsorption of 123 ml/100 g, 66.5 parts of diethylene glycol monobutyl ether, 2.0 parts of triethanolamine and 1.5 parts of polyvinylbutyral was prepared. After grinding, a readily flowable, pumpable carbon black preparation of high colour strength was obtained.

Example 11

By the same process as described in Example 2, a black pigment preparation comprising 15 parts of a carbon black colourant having a BET surface area of 100 m²/g, 82.2 parts of diethylene glycol monobutyl ether, 2.0 parts of triethanolamine and 0.8 part of polyvinylbutyral was prepared. After grinding, a readily flowable, pumpable carbon black preparation of high colour strength was obtained.

Example 12

By the same process as described in Example 2, a black pigment preparation comprising 35 parts of a carbon black colourant from Example 1, 58.2 parts of diethylene glycol monobutyl ether, 2.0 parts of triethanolamine and 0.8 part of polyvinylbutyral was prepared. After grinding, a readily flowable, pumpable carbon black preparation of high colour strength was obtained.

Example 13

By the same process as described in Example 2, a black pigment preparation comprising 33 parts of a carbon black colourant from Example 1, 63.6 parts of a reaction product of 1 mol of phenol and 4 mol of propylene oxide, 2.0 parts of N-methyldiethanolamine, 0.8 part of polyvinylbutyral and 0.6 part of o-phosphoric acid (85% strength) was prepared. After grinding, a readily flowable, pumpable carbon black preparation of high colour strength was obtained.

Example 14

By the same process as described in Example 2, a black pigment preparation comprising 27 parts of a carbon black colourant having a BET surface area of 65 $m^2/g$, 69.4 parts of reaction product of 1 mol of butanol and 4 mol of propylene oxide, 2.0 parts of triethanolamine and 1.0 part of polyvinylbutyral was prepared. After grinding, a readily flowable, pumpable carbon black preparation of high colour strength was obtained.

Example 15

By the same process as described in Example 2, a black pigment preparation comprising 35 parts of a carbon black colourant from Example 1, 60.5 parts of diethylene glycol monobutyl ether, 3.0 parts of triethanolamine and 1.5 parts polyvinylpyrrolidone was prepared. After grinding, a readily flowable, pumpable carbon black preparation of adequate colour strength was obtained.

Example 16

A red pigment preparation comprising 15 parts of a monoazo pigment (C.I. Pigment Red 48:3), 41 parts of the adipic acid ester from Example 1, 41 parts of diethylene glycol monobutyl ether, 2.0 parts of triethanolamine and 1.0 part of polyvinylbutyral was homogenized by means of a dissolver and ground as described in Example 1.

In comparison with a pigment preparation prepared in the same way, comprising 15 parts of the same coloured pigment and 85 parts of the same adipic acid ester, an improved flowability and significantly lower viscosity of 3400 mPas, compared with 12,700 mPas of the comparison paste (measured at a shear grading of 7 $s^{-1}$ and 23° C.) resulted.

TABLE 1

Comparison Table 1

| Example | Viscosity D = 7/s T = 23° C. (mPas) | Flow properties | Colour strength in polyester-urethane % |
|---|---|---|---|
| 1 | about 19000 | thixotropic flow | 100 |
| 2 | about 1600 | slightly thixotropic, good flow | 190 |
| 3 | about 4700 | thixotropic, good flow | 190 |
| 4 | about 1700 | slightly thixotropic, good flow | 190 |
| 5 | about 1900 | slightly thixotropic, good flow | 190 |
| 6 | about 1800 | slightly thixotropic, good flow | 190 |
| 7 | about 3500 | thixotropic flow | 170 |
| 8 | about 1600 | slightly thixotropic, good flow | 190 |
| 9 | about 2100 | slightly thixotropic, good flow | 190 |
| 10 | about 1800 | slightly thixotropic, good flow | 190 |
| 11 | about 1500 | very good flow | 120 |
| 12 | about 1800 | slightly thixotropic, good flow | 190 |
| 13 | about 2500 | slightly thixotropic, good flow | 180 |
| 14 | about 2200 | slightly thixotropic, good flow | 180 |
| 15 | about 2100 | slightly thixotropic, good flow | 170 |

What is claimed is:

1. A pigment preparation comprising at least
    a) 5 to 80% by weight, based on the preparation, of pigment,
    b) a paste-making agent that is liquid at 20° C. under normal pressure,
    c) an amine and/or salt thereof having a nitrogen content, based on the amine and/or salt thereof, of $\geq 8\%$ by weight and an average molecular weight, determined as the number average, of $\leq 500$ g/mol, and
    d) a homopolymer and/or copolymer of ethylenically unsaturated monomers or comonomers having an average molecular weight, determined as the number average, of 10,000 to 100,000.

2. The pigment preparation according to claim 1, comprising
    a) 5 to 80% by weight of pigment,
    b) 19 to 95% by weight of the paste-making agent and
    c) 0.2 to 10% by weight of the amine and/or salt thereof and
    d) 0.2 to 10% by weight of the homo- or copolymer, the percentage data in each case relating to the sum of components a) to d).

3. The pigment preparation according to claim 1 comprising
    a) 10 to 60% by weight of pigment,
    b) 40 to 90% by weight of the paste-making agent,
    c) 0.5 to 5% by weight of the amine and/or salt thereof and
    d) 0.5 to 3% by weight of the homo- or copolymer, the percentage data in each case relating to the sum of components a) to d).

4. The pigment preparation according to claim 1 which comprises at least one pigment from the group consisting of the azo, anthraquinone and thioindigo series, polycyclic pigments, such as phthalocyanine, naphthalenetetracarboxylic acid, quinacridone, perylenetetracarboxylic acid or isoindioline pigments, metal complex pigments, laked dyestuffs, such as Ca, Mg and Al lakes of dyestuffs containing sulphonic acid and/or carboxylic acid groups, inorganic pigments and carbon black.

5. The pigment preparation according to claim 1, which comprises as a pigment carbon black.

6. The pigment preparation according to claim 1, wherein an ether or ester of a monoalcohol or polyol is employed as the paste-making agent.

7. The pigment preparation according to claim 1, wherein a monohydroxy ether, polether-polyol or polyester-polyol is employed as the paste-making agent.

8. The pigment preparation according to claim 6, wherein the paste-making agent is a monohydroxy ether which corresponds to an ethylene oxide- and/or propylene oxide-polyether started on a mono-$C_1$–$C_{12}$-alcohol.

9. The pigment preparation according to claim 6, wherein the paste-making agent is a monohydroxy ether which corresponds to an ethylene oxide- and/or propylene oxide-polyether started on an aliphatic, cycloaliphatic or aromatic $C_1$–$C_{12}$-alcohol.

10. The pigment preparation according to claim 6, wherein the monohydroxy ether is a mono-$C_1$–$C_4$-alkyl glycol ether.

11. The pigment preparation according to claim 6, wherein the monohydroxy ether is a monomethyl, -ethyl, -isopropyl, -n-propyl, -n-butyl, -sec-butyl or -tert-butyl alcohol ether.

12. The pigment preparation according to claim 6, wherein the monohydroxy ether is a mono-n-butylethylene glycol ether or a mono-n-butyldiethylene glycol ether.

13. The pigment preparation according to claim 1, wherein an amine from the following group or a salt thereof of an inorganic or organic acid, a quaternary ammonium compound thereof or an amine oxide or betaine thereof is employed as component c):

ethanolamine, methylethanolamine, dimethylethanolamine, diethylethanolamine, diethanolamine, methyl-diethanolamine, triethanolamine, 2-hydroxypropylamine, dimethylpropanolamine, diethylpropanolamine, dipropanolamine, tripropanolamine, 2-dimethylaminoethyl-ethanol, cyclohexylamine, methylcyclohexylamine, dimethylcyclohexylamine, hydroxyethyl-cyclohexylamine, dihydroxyethyl-cyclohexylamine, hydroxyethyl-ethylenediamine and hydroxypropylethylenediamine, heterocyclic compounds with basic amino groups, ethylenediamine, 1,2-propylenediamine, diethyltriamine, triethylenetetramine, tetraethylenepentamine or reaction products thereof with ethylene oxide or propylene oxide, 3-dimethylamino-propylamine, polyglycol ethers with terminal amino groups, reaction products of di-isocyanates with dimethylethanolamine or dimethylamino-propylamine, aminoacetic acid, aminodiacetic acid, nitrilotriacetic acid, ethylenediaminetetraacetic acid or amidomethanephosphonic acid.

14. The pigment preparation according to claim 1, wherein the homo- and/or copolymer of component d) is soluble in organic solvents or in component b) at 20° C.

15. The pigment preparation according to claim 1, wherein the homo- and/or copolymer of component d) employed is a compound from the following group:

polyvinyl acetate, polyvinylformal, polyvinylbutyral, polyvinylpyrrolidone, cellulose acetate, cellulose acetate-butyrates, a copolymer of vinylpyrrolidone with vinyl acetate, vinyl ethers or styrene and polymers or co-polymers of acrylic or methacrylic esters with other ethylenically unsaturated comonomers.

16. A process for the preparation of the pigment preparation according to claim 1, wherein components a), b), c) and d) are homogenized in a wet comminution unit.

17. A process for pigmenting organic macromolecular material, wherein the pigment preparation according to claim 1 is used.

18. The process according to claim 17 for pigmenting polyurethanes, wherein the pigment preparation is added either to the polyol component, the polyisocyanate component or a reaction mixture thereof before or during the formation of the polyurethanes.

19. An organic macromolecular material pigmented with a pigment preparation according to claim 1.

20. Polyurethanes pigmented with a pigment preparation according to claim 1.

* * * * *